United States Patent [19]
Disbrow

[11] 4,365,882
[45] Dec. 28, 1982

[54] COLOR STANDARD METHOD AND APPARATUS

[76] Inventor: Lynnford E. Disbrow, 1400 W. Bruneau, Kennewick, Wash. 99336

[21] Appl. No.: 278,644

[22] Filed: Jun. 29, 1981

[51] Int. Cl.³ .................. G03B 17/24; G03B 27/76
[52] U.S. Cl. ................................ 354/106; 355/40
[58] Field of Search .............. 355/40; 354/105, 106, 354/109

[56] References Cited

U.S. PATENT DOCUMENTS

| | | | |
|---|---|---|---|
| 3,029,717 | 4/1962 | Hildebrandt | 354/106 |
| 3,718,074 | 2/1973 | Davis | 354/109 |
| 3,836,246 | 9/1974 | Bowker | 355/40 X |
| 3,971,049 | 7/1976 | Ohmori et al. | 354/105 X |
| 4,055,833 | 10/1977 | Rothfjell | 355/40 X |
| 4,211,558 | 7/1980 | Oguchi et al. | 430/359 |
| 4,227,211 | 10/1980 | Disbrow | 358/113 |

FOREIGN PATENT DOCUMENTS 1186537  2/1959  France ........................ 355/40

Primary Examiner—Donald A. Griffin
Attorney, Agent, or Firm—Wells, St. John & Roberts

[57] ABSTRACT

A method for providing a reference color standard for analysis of exposed color film frames in which adjacent areas of film are exposed by subjecting them to a preselected color pattern by transmission of a repeatable light value from a known light source. All exposed areas of the film are developed identically to the adjacent film frames. Light and color comparisons can be made between the exposed film frames and their adjacent exposed color standard areas. The apparatus includes a repeatable light source, such as an electronic flash unit; a changeable filter pack; and light transport means for directing the light from the source, through the filter pack and to the film surfaces adjacent to an exposed film frame. The color standard area is exposed simultaneously with each film frame for later color comparison usage.

2 Claims, 2 Drawing Figures

COLOR STANDARD METHOD AND APPARATUS

BACKGROUND OF THE INVENTION

This invention relates to a method and apparatus for providing a known color standard or reference within film areas within or directly adjacent to exposed frames along a roll of photographic film. The color standard is subsequently usable in the analysis of color values portrayed in the individual frames. The color standard areas are exposed under known conditions simultaneously with exposure of the corresponding film frames. Since the paired areas of film will be subjected to the same handling and development procedures, deviations from the preselected color standard values are measurable to provide an absolute reference against which the corresponding values in the exposed film frames can be compared.

This invention arose from an effort to further refine and perfect the methods disclosed in U.S. Pat. No. 4,227,211. The patent, which is hereby incorporated into this disclosure by reference, discloses a method for analyzing crop growing conditions during a growing season. The method involves aerial photographing of the crop and color analysis of the resulting photographs. In order to provide accurate comparison between photographs taken at different times of the day, on different days, and under different lighting conditions, and also to compensate for differing handling and developing of various rolls of film, it is essential to provide a color standard or reference against which each frame can be compared.

In the method as disclosed in Patent No. 4,227,211, the reference standard is achieved by exposing a frame of the film under known artificial light conditions to portray colored panels by reflective light. This has been found to be generally satisfactory when using hand-held cameras and relatively short rolls of film.

The use of a single slide or frame as a reference or standard for an entire roll of film is impractical when applying the crop analysis method to larger scale aerial cameras. These cameras typically use much longer rolls of film, which might be exposed over a substantial period of time. Since ambient lighting conditions vary over that period, and since film tends to "age" during handling and developing, there can exist substantial variations in the photographed images from one end of the long roll of film to the other. It is therefore necessary to provide multiple color standards along the length of the roll of film, and most preferable to provide a color standard in conjunction with each exposed film frame.

Furthermore, it is desirable to modify the color standard for different types of crops or vegetation being photographed along a single roll of film. By selecting a color standard including individual color components expected in the vegetation as portrayed in the area being photographed, one can draw immediate emperical comparisons between the actual photographs and the known standard. Modifying wall mounted color charts or areas is relatively difficult, very cumbersome, and basically impractical.

Color references associated with individual film frames have been previously proposed with respect to printing methods. An example is illustrated by U.S. Pat. No. 4,211,558 to Oguchi et al, issued July 8, 1980. A method is disclosed which involves printing a color or light sample of the ambient light average in the field of view of the sample receptor adjacent to each film frame, so that comparisons can be made to the color in the frame for accurate printing. The color sample is exposed simultaneously with the film frame, and records the light illuminating the object being photographed. This provides a reference for exposure correction purposes.

According to the present invention, an absolute color reference is desired, rather than the relative reference which would be attained by use of the ambient light illuminating the object being photographed. The present method and apparatus provide known color values to expose an area of film adjacent to the film frame by transmission of repeatable light values from a light source through variable filters selected to match expected color components in the vegetation portrayed in the land area being photographed.

It is an object of this invention to provide a method and apparatus whereby each film frame will be accompanied by a known color standard imprinted within or immediately adjacent to it and subjected to the same handling and developing sequences. Accurate correction factors and color comparisons can then be utilized in the analysis of the color values in the film frame itself.

DESCRIPTION OF THE PREFERRED EMBODIMENTS

The present method arose from refinement of the method disclosed in U.S. Pat. No. 4,227,211 for analyzing seasonal growing conditions of crops. One step in the method relates to exposure of a standard frame for comparison to a known standard master used in conjunction with an electronic color analyzer. Average color values in the exposed film frames are then compared to the standard frame, which is produced from flash lighted exposures of known reflective color areas on a wall.

Since larger aerial cameras have housing permanently fixed in the aircraft, photographing wall surfaces is impractical for color reference purposes. It would be very cumbersome and require external equipment to photograph known surface patterns with a known light source in conjunction with use of a conventional aerial camera.

Because of the great length of film rolls used in larger aerial cameras, different portions of a film roll can be subjected to different processing temperatures and chemical activity. Rolls of film several hundred feet long when developed in a constant feed processor can encounter different chemical activity due to aging of chemicals and possible variations in the replenishment of such chemicals as they are used. If an exposed standard film area is to yield valid results in comparing both color and density differentials in a film frame exposed under ambient lighting conditions, the standard film area must first be comparable to known color values and secondly must be subjected to the same handling and processing as the film frame with which it is used.

The present disclosure solves this problem by a method of providing a known color standard area within or immediately adjacent each exposed film frame. This color standard area and its associated film frame are subjected to identical handling and processing conditions, so that accurate comparisons can be made between the color components of the standard area and those in the developed film frame.

Figure 1:
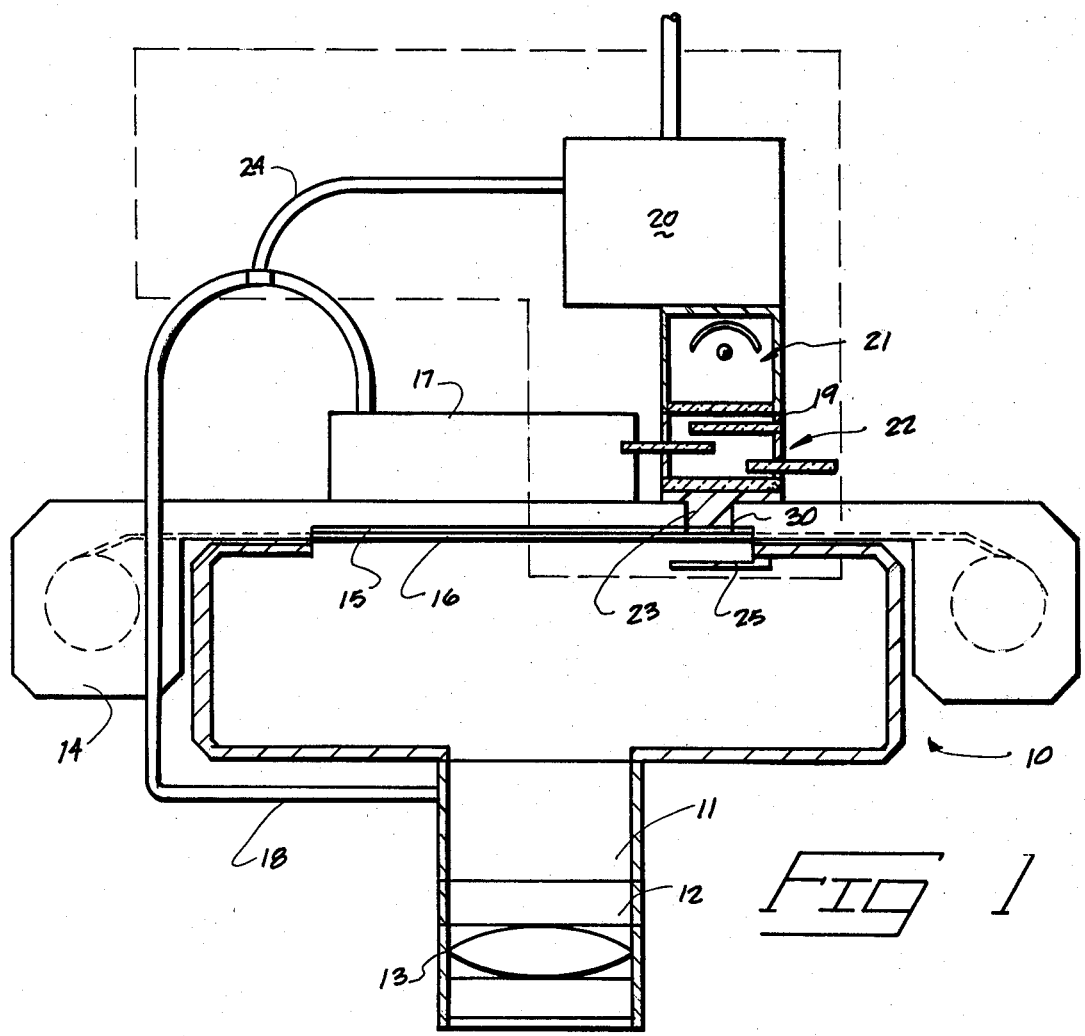
FIG. 1 is a schematic elevation view of an aerial camera embodying the present invention.

The apparatus used to achieve these results is schematically illustrated in FIG. 1. FIG. 1 illustrates a fixed camera housing 10 which would normally be mounted within an aircraft for aerial photography. The housing 10 mounts a conventional shutter assembly schematically shown at 11, as well as a conventional changeable aperture 12 and a lens system 13.

Long rolls of film are typically supplied to such aerial cameras in film packs 14 which are replaceably attached to the back of the housing 10. Each film pack 14 includes a film pressure plate 15 that defines the rear plane of the film being exposed. The film itself is shown at 16. A conventional data plenum 17 is provided either on the housing 10 or film pack 14 for exposing visual information along the film 16, such as time of exposure, date, and other identifying indicia. The operation of the data plenum 17 is typically synchronized with operation of shutter 11 through an interconnecting triggering circuit schematically shown at 18.

All of the above items are conventional today in various forms of aerial cameras, and further details are not believed to be necessary in order to provide a full understanding of the present method and apparatus.

The present device can be produced as either an attachment for existing cameras or can be incorporated integrally in a specially designed camera. It essentially comprises a power source 20, a light source 21, filter means 22 and light transporting means 23 which directs light transmitted from the light source 21 and through filter means 22 onto the backside of film 16. By using a light source of known light value and filter means of known color value, each frame of film can be exposed simultaneously to a known color standard at the time of its exposure. Synchronism can be achieved by a triggering circuit illustrated schematically at 24 operatively connected to the shutter 11 of the camera.

The light source 21 is preferably a conventional electronic photoflash unit, which is a readily available constant light source. However, it is to be understood that the light source 21 could be a different form of light means, such as a constantly operable source having a shutter that controls the time of exposure of the film area to which it is directed.

The exact nature of the light provided by the light source 21 is not important to the present disclosure so long as it is repeatable during use of the invention. This is practically possible with conventional electronic photoflash units, which can be consistently repeated in operation through several thousand flashes with no discernable changes in the amount of light provided each time. The consistency of operation can be enhanced by accurately controlling the electrical charging voltage supplied to the capacitors typically used to store the necessary energy required by the electronic photoflash unit. The supply voltage from the power supply 20 must be regulated within a narrow band. Control of these factors is well known and within the skill of those knowledgeable in the design and operation of electronic photoflash equipment.

The filter means 22 is preferably a changeable filter pack in which a plurality of conventional color filters can be superimposed between the light source 21 and the camera. It might comprise a supporting housing 19 with sliding supports for receiving individual overlapping filters.

The exact color mix used in the filter means will depend upon the nature of the film and expected color components in the vegetation of a land area being photographed. Since different varieties of crops have different optimum color signatures in both normal and infrared photography, the color standard must be variable to accurately simulate the expected colors in the photographed crop. Different films, both positive and negative, have chemical characteristics that must be balanced by the color standard for accurate color portrayal. The specific filter combination will be determined by trial and error testing, bracketing filter choices and comparing color values to the photographed vegetation. As an example, a typical composite filter pack for a russet potato crop photographed by use of infrared film of medium speed would have 80% of its filtered area as Eastman Kodak Company Filter No. 89B (infrared), 6% of its filtered area as Eastman Kodak Company Filter No. 25R (red), and 14% of its filtered area as Eastman Kodak Company Filter No. 58G (green).

A neutral translucent white diffuser is included within the filter means 22 and is interposed between the overlapping filters and the camera. It blends the filtered light into a single color standard, which is transmitted to the back of film 16 by a short length of optical fiber shown as transport means 23. The optical fiber or "light tube" directs the blended colored light through an aperture 30 in plate 15 to a defined area at the back of film 16 within the film frame being exposed by the conventional shutter mechanism 11.

To prevent normal exposure of the area to which light is directed by transport means 23, a small opaque wall 25 is projected inwardly on housing 10 to overlap the film area exposed to the color standard. This blocks exposure of the surface of the film front surface at this small defined location.

As each film frame is exposed in the conventional manner by operation of the camera, the triggering circuit shown at 24 will operate the electronic flash unit in light source 21 to simultaneously expose the small adjacent area of film underlying the light tube shown at 23. This will expose the area of the film to the preselected color standard light values, using the selected combined color achieved by the choice of filters and the repeatable light values provided by the light source 21. This will result in a standard area on the film within each frame which has color values very close to the optimum mature crop reflectance under ideal lighting conditions.

In actual practice, few aerial photographs are taken under ideal lighting conditions. Light varies during each day, with the time of day, ambient cloud cover, and with changing calendar seasons. There can be substantial lighting changes from one portion of a roll of film to another. The color standard area adjacent to each film frame provides exposure of the film area under known light and color conditions for comparison purposes. Comparisons can be made between the developed standard area and the known color values to which it was exposed, and between the developed standard area and the adjacent developed film frame area.

Figure 2:
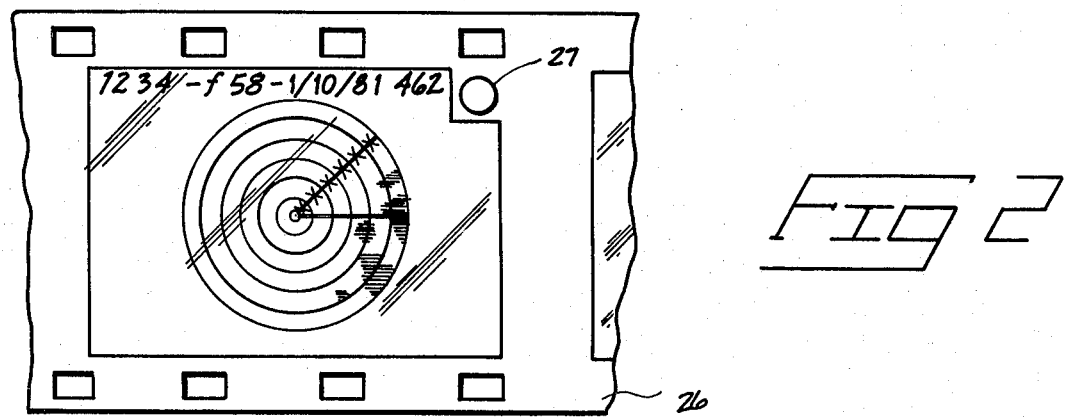
FIG. 2 is a schematic view showing a developed film frame and adjacent color standard area according to this disclosure.

When the film is processed, the areas exposed to the known light and color values will be processed as an integral adjunct to each film frame, resulting in a developed film pattern such as that shown in FIG. 2, where the film frame is shown at 26 and the adjacent standard color area at 27. It is to be understood that the area 26 can be either outside or inside the film frame 27, and can have any geometric shape desired for a particular purpose.

The use of an electronic color analyzer (not shown) to compare the resulting developed color values in area 27 to the known light and color values to which it was exposed calibrates the analyser for film developing variations. After such calibration, the electronic color analyzer can be utilized as described in detail in U.S. Pat. No. 4,211,558 to determine the growing conditions of the vegetation or crop area that is portrayed within the adjacent film frame. Such comparisons can be much more accurately determined by customizing the choice of color values portrayed in area 26 to match those expected under optimum conditions in the vegetation photographed and portrayed within the film frame 27.

The basic process involves the step of exposing the film frame to a selected subject under ambient lighting conditions and simultaneously exposing an area of film within or adjacent to the frame to a preselected color pattern by transmission of repeatable light and color values from a known light source. It further includes the step of developing the film by subjecting the frame and adjacent exposed area to identical processing steps, whereby comparisons can be made between the resulting average color values portrayed in the developed area and those in the developed film frame adjacent to it.

Having described my invention, I claim:

1. A method of comparing color values in an aerial photograph of a land area to a known standard, comprising the following steps:

selecting a plurality of filters matching averaged individual color components expected in vegetation as portrayed in the land area when photographed;

photographing the land area by exposure of a film frame under ambient lighting conditions;

simultaneously exposing an area of film within the frame to a preselected color pattern by transmission of repeatable light and color values from a known light source through said plurality of filters;

and developing the film by subjecting the frame and adjacent area to identical processing steps, whereby comparisons can be made between the resulting average color values portrayed in the developed area of film and those in the developed frame adjacent to it.

2. A method as set out in claim 1 wherein the area of film is exposed by transmission of light from an electronic flash unit.

* * * * *